United States Patent [19]

Sorbier

[11] 4,297,253

[45] Oct. 27, 1981

[54] METHOD OF MAKING MOLDABLE PRODUCT

[76] Inventor: Pierre Sorbier, Place de la Mairie, 84210 Pernes Les Fontaines, France

[21] Appl. No.: 68,144

[22] Filed: Aug. 20, 1979

[30] Foreign Application Priority Data

Sep. 1, 1978 [FR] France ................................ 78 25291

[51] Int. Cl.³ ...................... C08L 97/00; B05D 7/00; B05D 3/02
[52] U.S. Cl. ...................................... 260/17.3; 260/9; 260/17.2; 427/214; 427/393; 427/408; 427/382; 264/137
[58] Field of Search ................ 260/17.5, 17.3, 9, 17.2; 427/393, 214, 408, 382; 106/123; 264/137

[56] References Cited

U.S. PATENT DOCUMENTS

| | | | |
|---|---|---|---|
| 4,130,515 | 12/1978 | Bornstein | ........................... 260/17.5 |
| 4,139,508 | 2/1979 | Sorbier | ............................... 260/17.5 |
| 4,165,353 | 8/1979 | Sorbier | ................................. 264/120 |
| 4,186,242 | 1/1980 | Holmquist | ..................... 260/17.5 X |

*Primary Examiner*—Michael R. Lusignan
*Attorney, Agent, or Firm*—Brisebois & Kruger

[57] ABSTRACT

A product which can be molded to form a food container. The product is composed of lignin fibres or fibrils which are impregnated with a polymerizable resin, in one or more steps. The fibrils or fibres are formed in a homogeneous mass to permit molding the lignin product into an article under heat and pressure to polymerize the resin.

8 Claims, No Drawings

METHOD OF MAKING MOLDABLE PRODUCT

SUMMARY OF THE INVENTION

The present invention relates to a novel moldable product, to a process for forming the moldable product, and to the molded products which may be obtained using this moldable product.

Applicant has already described in his French patent application No. 75.30849 a process for forming novel objects by molding ligneous materials, these products having the property that they have a high resistance to heat and a particularly attractive and satisfactory surface state, imitating if desired, earthenware or porcelain.

It may be desirable, for example in view of the application for packaging food products to be able to form these objects by molding a very inexpensive material, while at the same time providing a good surface appearance and physical and chemical properties compatible with uses in the food packaging field.

Thus for example it is desirable to have a material which permits forming packages, for example small trays or similar items, able to compete with, by their net cost, wrappings of plastic material, generally thermoformed, used until now, which are not, or are only with great difficulty biodegradable after use.

The object of the present invention is the new industrial product comprising a moldable product characterized by the fact that it is made of fibrils of lignin or ligneous material, finely divided, each impregnated with a polymerizable resin.

The moldable product, according to the invention, takes the form of a non-agglomerated dry mass of short fibrils or fragments of fibrils impregnated with polymerizable resin.

The fibrils of the moldable product according to the invention have a length of less than 8 mm. and generally between about 2 and about 4 mm., these fibrils having a maximum dimension in section of about 2 to 3 tenths of a millimeter.

The starting lignin material for obtaining the moldable product according to the invention can advantageously but not necessarily, be wood fibers obtained by the process described in applicant's French patent application No. 76.28984.

In order to obtain the product according to the invention, particularly for forming objects for use in food packaging and having good imperviousness characteristics due to the absence of microporosity, the product according to the invention is made by submitting the fibers or fibrils of the starting lignin material to at least two successive steps of impregnation with polymerizable resin, each of the impregnation steps being followed by drying. Each of the impregnation steps could be accomplished by spraying on the lignin material a polymerizable resin solution accompanied by a simultaneous mixing. After the first impregnation step the impregnated material is dried so as to bring its moisture content to below about 10% and the drying after the second impregnation step being carried out so as to bring the moisture content of the product to less than about 3%.

Of course the use of two or more successive impregnation steps results in a product which lends itself particularly well to packaging applications for food products. In other applications where such good characteristics of absence of microporosity are not necessary, only a single impregnation step can be used.

In one particular embodiment of the process according to the invention, to give the molded objects made from the product according to the invention good retention properties at temperatures clearly greater than 100° C., the starting lignin material undergoes a preliminary impregnation step in an aqueous solution of calcium carbonate preferably a boiling solution, this aqueous solution preferably containing 100 to 300 g per liter of calcium carbonate.

This impregnation step takes about 5 min. Next comes draining and then drying to bring the moisture content to about 10%, the temperature during drying not exceeding about 110° C.

Following this is one more impregnation steps with polymerizable resin.

For the polymerizable resin according to the invention, use could be made of melamine resin which is particularly suitable for use with food. The impregnation then takes place in the form of an aqueous or water-alcohol solution of soluble melamine.

After the drying step following the last impregnation, the material can then advantageously undergo a homogenization step for the fibers or fibrils impregnated with resin, this step being advantageously carried out in a device similar to a screen against which the fibers or fibrils are applied so as to force them through the openings of the screen. A screen with square openings preferably 2.5 mm on a side is particularly advantageous according to the invention.

When melamine resin is used as the polymerizable resin, it is advantageous to immerse the fibers or fibrils of the starting lignin material, if necessary impregnated with calcium carbonate, before their impregnation with the polymerizable resin, in an aqueous solution of urea, preferably 2% by weight. After this immersion they are dried so as to bring the moisture content fibers or fibrils impregnated with urea to less than about 10%. Then follows the impregnation in ore or more steps, with melamine.

It is however particularly advantageous, when melamine resin is used as the polymerizable resin, instead of carrying out a preliminary impregnation in urea, to use for the impregnation with the polymerizable resin, an aqueous solution of melamine and urea in which the amount of urea is approximately equal to 5% by weight of the amount of melamine.

This impregnation solution can also contain calcium carbonate.

Of course other types of resins could be used, such as for example triazine resins, epoxide, phenolformol, resorcinol-formol, resorcinol-phenol-formol, resorcinol or urea-formol with or without the addition of melamine or resorcinol, particularly when the objects to be obtained are not for food products.

The moldable product thus obtained according to the invention may be wrapped or packaged and stored for future use. However, it should be stored away from air and light.

At the time of use, it can be advantageous, if the product was made using melamine, to impregnate it by spraying with a solution of ammonium chloride of less than 1% by weight of ammonium chloride with respect to the weight of melamine in the moldable product.

With the product according to the invention, all sorts of objects may be molded, especially packaging objects, with thin walls presenting a very good surface appearance and excellent neutrality qualities with respect to food products.

One can also realize with the invention, packages in the form of jars and pots, for yogurts, creams and similar products, having a light color and a good surface appearance, which may be manufactured industrially at a price competitive with the thermo-formed plastic materials used until now.

In order to make the invention more clearly understood, one method of implementation will be described in the following example, purely by way of illustration and in no way limiting.

EXAMPLE

A lignin material is used to start with which has the form of wood fibers or slivers with a thickness of less than 1/10th of a millimeter and a width of less than 0.5 mm.

This lignin material is immersed for about 5 minutes in an aqueous solution, maintained boiling, and containing 100 g per liter of calcium carbonate.

Next comes draining or suction drying followed by drying to bring the moisture content to about 10%, the temperature during drying being maintained below 110° C.

The material thus treated is impregnated with a solution constituted of the following mixture by weight:

| | |
|---|---|
| soluble melamine resin | 250 g |
| water | 300 g |
| urea | 12 g |
| calcium carbonate | 100 g |

The impregnation is accomplished by spraying and vigorous agitation by mixing, of the material.

The material is then dried to attain residual moisture content of about 10%, the drying temperature preferably being held below about 60° C.

Next comes another impregnation step with the above mixture, following which there is another drying to bring the moisture content to about 3%, the drying temperature being held below about 60° C.

The resultant product is then homogenized by division by passage through an element in the shape of a screen with square meshes, 2.5 mm on a side, so as to divide the fibers or fibrils so that the length of the fibrils in the finished product is about 2 to 4 mm, the dimension in section being about 2 to 3 tenths of a millimeter.

The product is then molded into the shape of the desired objects so as to cause the polymerization of the resin impregnating the fibrils. The molding of the product into such objects or packages can be done in the manner disclosed in French Application No. 75.30849, and in the manner generally disclosed in Applicant's U.S. Pat. No. 4,165,353.

Thus according to the invention it is possible to make packages or containers in the form of jars or pots and in the form of small trays or cups which have the advantage of being completely harmless and inert with respect to the food products they may contain while having a particularly aesthetic appearance.

Of course many modifications may be made to the present invention without exceeding either its scope or its meaning.

What is claimed is:

1. A process for manufacturing a moldable product composed of minute fibers of a ligneous material, said fibers having a length greater than their width, comprising the steps of: impregnating thin elongated slivers of the ligneous material with a polymerizable resin, then drying the slivers, then again impregnating the slivers with polymerizable resin, then again drying the slivers, and then homogenizing the slivers to reduce their size and form said minute fibers.

2. A process according to claim 1 wherein each step of impregnation comprises, spraying a solution of polymerizable resin on the slivers while mixing the slivers.

3. A process for manufacturing a moldable product containing fibers of a ligneous material comprising the steps of: impregnating the fibers with a polymerizable resin, then drying the fibers, then again impregnating the fibers with polymerizable resin and again drying the fibers, and then homogenizing the fibers, and wherein after the first step of impregnating, the fibers are dried to a moisture content of less than 10%, and after the second step of impregnating, the fibers are dried to a moisture content of less than 3%.

4. A process according to claim 1, 2 or 3 wherein said impregnating with a polymerizable resin comprises impregnating with an aqueous solution of soluble melamine resin.

5. A process according to claim 4 wherein the aqueous solution of soluble melamine resin further contains urea, in an amount equal to about 5% by weight of the melamine in the aqueous solution.

6. A process according to claim 5 wherein said aqueous solution further contains calcium carbonate.

7. A process according to claim 1, wherein said fibers are less than 8 mm in length.

8. A process according to claim 1, wherein said fibers are less than 0.5 mm in section.

* * * * *